United States Patent

Johnson et al.

[11] Patent Number: 5,995,257
[45] Date of Patent: Nov. 30, 1999

[54] ADD/DROP MULTIPLEXER FOR MULTIWAVELENGTH PULSE ORIENTED OPTICAL COMMUNICATIONS SYSTEMS

[75] Inventors: William J. Johnson, Flower Mound; Dale T. Wingo, Richardson, both of Tex.

[73] Assignee: MCI Communications Corporation, Washington, D.C.

[21] Appl. No.: 08/950,452

[22] Filed: Oct. 15, 1997

[51] Int. Cl.$^6$ ................................................ H04J 14/02
[52] U.S. Cl. ............................................ 359/127; 359/124
[58] Field of Search ............................ 359/124, 127–131

[56] References Cited

U.S. PATENT DOCUMENTS

| | | | |
|---|---|---|---|
| 5,548,431 | 8/1996 | Shin et al. | 359/119 |
| 5,717,795 | 2/1998 | Sharma et al. | 385/24 |
| 5,751,456 | 5/1998 | Koonen | 359/127 |
| 5,777,762 | 7/1998 | Yamamoto | 359/123 |
| 5,786,913 | 7/1998 | Pleiffer | 359/119 |
| 5,822,095 | 10/1998 | Taga et al. | 359/127 |
| 5,867,289 | 2/1999 | Gerstel et al. | 359/110 |
| 5,903,371 | 5/1999 | Arecco et al. | 359/119 |
| 5,926,300 | 7/1999 | Miyakawa et al. | 359/124 |

*Primary Examiner*—Jason Chan
*Assistant Examiner*—Hanh Phan

[57] ABSTRACT

A method of adding multibit data units to and dropping multibit data units from a stream of multiwavelength optical pulse multibit data units converts the stream of multiwavelength optical pulse multibit data units into a serial stream electrical bits, identifies add locations in the stream of electrical bits to add multibit data units to the stream of electrical bits, and identifies drop locations in the stream of electrical bits to drop multibit data units from the stream of electrical bits. The method adds multibit data units to the stream of electrical bits at the add locations, and drops multibit data units from the stream of electrical bits at the drop locations. Then, the method converts the stream of electrical data bits to which multibit data units have been added and from which multibit data units have been dropped into a stream of multiwavelength optical pulse data multibit data units.

16 Claims, 6 Drawing Sheets

ADD/DROP MULTIPLEXER FOR MULTIWAVELENGTH PULSE ORIENTED OPTICAL COMMUNICATIONS SYSTEMS

CROSS-REFERENCE TO RELATED APPLICATION

The present application is related to application Ser. No. 08/922,900, filed Sep. 3, 1997 and entitled METHOD OF AND SYSTEM FOR TRANSMITTING DATA, pending.

FIELD OF THE INVENTION

The present invention relates generally to methods of and systems for transmitting and receiving data, and more particularly to a method of and system for adding data to and dropping data from a stream of multiwavelength multibit, for example words or bytes, optical pulse data.

DESCRIPTION OF THE PRIOR ART

Optical fiber systems have become the physical transport media of choice in long distance telephone and data communications networks. Generally, an optical fiber system includes an optical transmitter and an optical receiver connected together by optical fiber transmission media. The optical transmitter includes a laser that produces an optical beam at a particular wavelength and a modulator that modulates the optical beam according to a serial stream of electrical data bits to produce a stream of serial optical data bits. The receiver includes an optical detector that receives a serial stream of optical data bits and converts that stream into a serial stream of electrical data bits.

Currently, commercial optical transmitters and receivers can operate at data rates as high as about 9.6 gigabits per second (Gbps). Recently, the capacity of optical fiber cables has been increased by the use of wavelength division multiplexing. In an optical wavelength division multiplexing system, optical signals with several carrier wavelengths are transmitted on the same optical fiber. Each carrier is individually modulated by a separate optical transmitter and carries different information. The individual carriers are multiplexed by a wavelength division multiplexer into a single optical fiber. At the receiving end, a wavelength division demultiplexer separates the individual carriers. The individual carriers are received by separate optical receivers.

In application Ser. No. 08/922,900, filed Sep. 3, 1997, and entitled METHOD OF AND SYSTEM FOR TRANSMITTING DATA (Attorney Docket No. RIC-96-159 (20350.00028)), there is disclosed a method of and a system for transmitting serial streams of electrical data bits by substantially simultaneously converting each bit of a multibit data unit, such as a word or byte, of the serial stream of electrical data bits into an optical bit, each optical bit having a different wavelength, and multiplexing each optical bit into a single multiwavelength optical pulse data units. Thus, the method of and system of the Ser. No. 08/922,900 application produces a stream of multiwavelength pulse data units that can transmit serial data at a data rate always higher than the repetition rate or modulation rate of optical laser transmitters.

Digital data, including digitized telephone calls, is transmitted between nodes of an optical network in bit interleaved frames. Certain network circuits originate and terminate at various nodes of the network. It is necessary to be able to add data to frames at originating nodes and drop data from frames at terminating nodes. Adding data to and dropping data from frames is accomplished by add/drop multiplexers. Currently, there is no add/drop multiplexer for optical systems in which data is transmitted as a stream of multiwavelength multibit optical pulse data units.

SUMMARY OF THE INVENTION

The present invention provides a method of adding multibit data units, i.e. words or bytes, to and dropping multibit data units from a stream of multiwavelength optical pulse multibit data units. For purpose of this disclosure multibit data units include data words and bytes of any length. Briefly stated, the method of the present invention converts the stream of multiwavelength optical pulse data units into a serial stream electrical bits, identifies add locations in the stream of electrical bits to add bytes to the stream of electrical bits, and identifies drop locations in the stream of electrical bits to drop bytes from the stream of electrical bits. The method adds bytes to the stream of electrical bits at the add locations, and drops bytes from the stream of electrical bits at the drop locations. Then, the method converts the stream of electrical data bits to which bytes have been added, and from which bytes have been dropped, into a stream of multiwavelength optical pulse data bytes.

The method converts the stream of multiwavelength optical pulse multibit data units into the stream electrical bits by first demultiplexing each multiwavelength optical pulse byte into a plurality of single wavelength optical bits. Then the method converts each of the single wavelength optical bits into an electrical bit. Finally, the method places the electrical bits into a data buffer. The size of the multiblt data unit, which corresponds to the number of wavelengths used to form the pulses, is the minimum sized data unit by which data is managed in the data buffer.

The method identifies add and drop locations in the stream of electrical bits by identifying an offset into the data buffer according to the minimum sized unit of data, for example words or bytes. The method receives an optical framing signal on a separate wavelength from the wavelengths of the stream of multiwavelength optical pulse bytes. The framing signal contains delimiters that identify the beginning and end of frames of data bytes, which the method uses to identify the location of the frame beginning and end points in the data buffer. Add and drop locations are identified in add and drop maps, respectively, as offsets from the beginning of a frame. The method uses the add and drop maps to determine the locations in the data buffer at which to add and drop data before converting the electrical bits in the data buffer back to optical pulse multibit data units. Circuit sizes of the maps define some set of multibit data units in the data buffer.

DESCRIPTION OF THE PREFERRED EMBODIMENT

Figure 1:
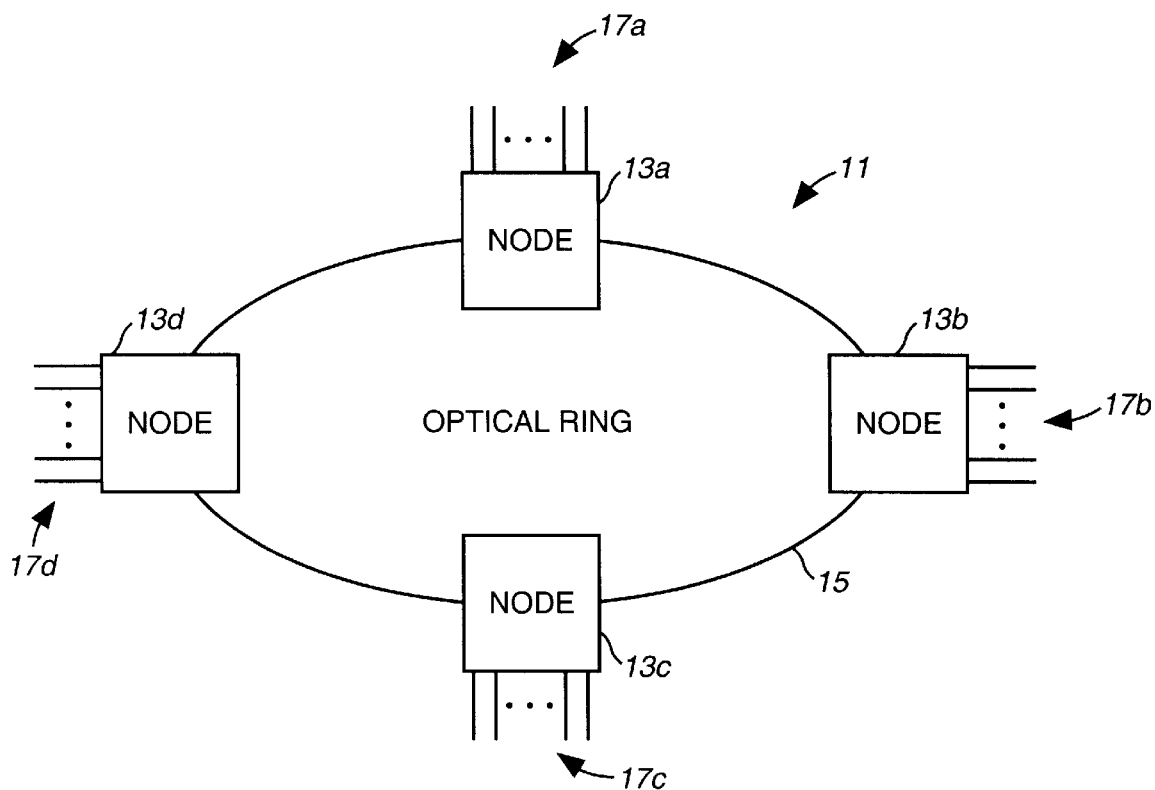
FIG. 1 is a block diagram of an optical network according to the present invention.

Referring now to the drawings, and first to FIG. 1, an optical ring is designated generally by the numeral 11. Optical ring 11 includes a plurality of nodes 13 interconnected by optical fiber cable 15.

Each node 13 is connected to a plurality of trunks, collectively designated by the numeral 17. Trunks 17, together with nodes 13 and optical fiber cable 15, form the physical part of circuits that carry data from an origination to a destination. For purposes of the present disclosure, the term circuit is used in its broadest sense to include a single byte, a DS0, a DS3, an OC12, or any other circuit of data.

Data is transmitted either unidirectionally or bidirectionally around optical ring 11 as a stream of multiwavelength optical pulse bytes or multibit data units as described in application Ser. No. 08/922,900, filed , Sep. 3, 1997, and entitled METHOD OF AND SYSTEM FOR TRANSMITTING DATA (Attorney Docket No. RIC-96-159 (20350.00028)), the disclosure which is incorporated herein by reference. In cases where nodes 13 are spaced a substantial distance apart from each other, appropriate regenerating and amplification installations are includes along the route of optical fiber cable 15.

In the preferred embodiment, the multiwavelength optical pulses are grouped into frames of bytes. The bytes in a frame are associated with various circuits and the byte(s) of a circuit are associated with a specified location in the frame. Thus, a circuit originating from a particular trunk 17a of node 13a and terminating to a particular trunk 17c of node 13c is formed by adding bytes at a specified location or locations in frames at node 13a and dropping bytes from that location or locations at node 13c.

Figure 2:
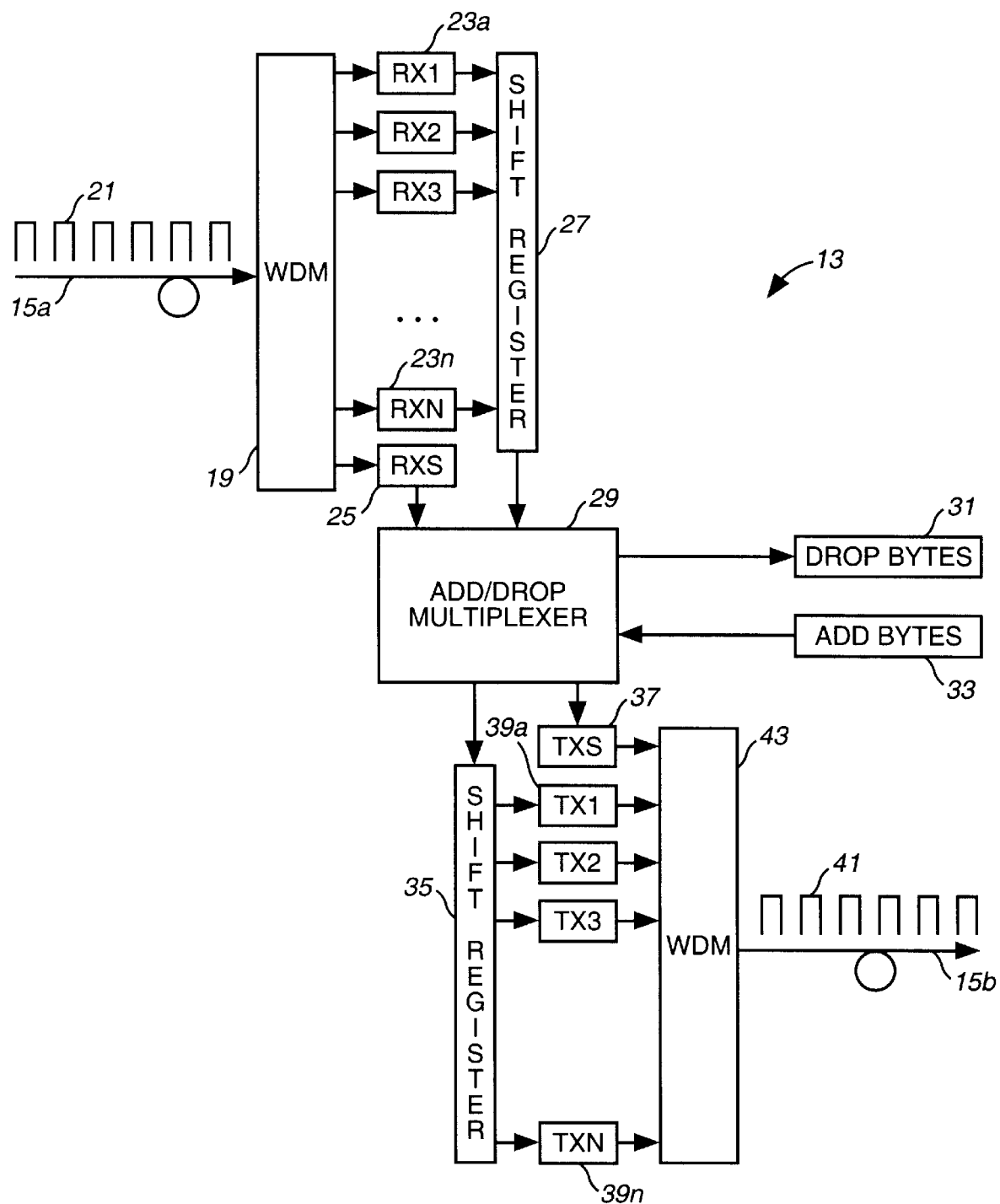
FIG. 2 is a block diagram of an optical node according to the present invention.

Referring now to FIG. 2, there is shown a block diagram of a node 13. Node 13 includes a wavelength division demultiplexer 19 which is adapted to receive a stream of incoming multiwavelength optical pulses 21, wherein each pulse comprises a multibit data unit. Each multiwavelength optical pulse 21 includes a plurality of optical data bits, each being transmitted on a different carrier wavelength. Additionally, the optical pulses 21 include an optical synchronization or framing bit that is transmitted on an optical carrier wavelength different from the wavelengths of the optical data bits. As will be explained in detail hereinafter, the synchronization or framing bits provide framing information according to the present invention.

Wavelength division demultiplexer 19 separates each multiwavelength optical pulse into its component wavelength parts or bits. The optical bits of each multiwavelength pulse 21 are received substantially simultaneously at a plurality of optical receivers. The data bits are received at optical receivers 23 and the framing bit is received at an optical receiver 25. Optical receivers 23 and 25 convert the optical bits substantially simultaneously into electrical bits. The data bits from receivers 23 are input substantially simultaneously to a parallel-in-serial-out shift register 27. Parallel-in-serial-out shift register 27 is operated to produce a serial stream of bits that are received at an add/drop multiplexer 29, the operation of which will be explained in detail hereinafter. The electrical framing bit produced by receiver 25 is also outputted to add/drop multiplexer 29.

Add/drop multiplexer 29 includes a first in first out (FIFO) data buffer, which will be described in connection with FIG. 3, and a FIFO delimiter queue, which will be described in connection with FIG. 4. The serial bit stream produced by parallel-in-serial-out shift register 27 is loaded into the data buffer. The stream of framing bits from receiver 25 is processed in add/drop multiplexer 29 and the result of the processing is placed in the delimiter queue. As will be explained in detail hereinafter, add/drop multiplexer 29 uses the information in the delimiter queue to identify the beginning and end points of frames within the data buffer. According to the present invention, add/drop multiplexer 29 drops bytes, as indicated at 31, from the data buffer, and adds bytes, as indicated at 33, to the data buffer. Add/drop multiplexer 29 includes suitable application programming interface (API) port data interfaces (not shown) to trunks 17, as is known to those skilled in the art.

After add and drop operations, if any, the contents of the data buffer are output serially from add/drop multiplexer 29 to one or more serial-in-parallel-out shift registers 35, as disclosed in application Ser. No. 08/922,900, filed Sep. 3, 1997 (Attorney Docket No. RIC-96-159 (20350.00028)). Framing bits are output from add/drop multiplexer 29 to a synchronization or framing bit transmitter 37. The serial-in-parallel-out shift register is clocked to output substantially simultaneously a bit to an optical data transmitter 39. Optical transmitters 37 and 39 each simultaneously output an optical bit, which is multiplexed into a single multiwavelength optical pulse 41 by a wavelength division multiplexer 43. The multiwavelength optical pulses 41 are carried on an outbound optical fiber 15b.

Figure 3:
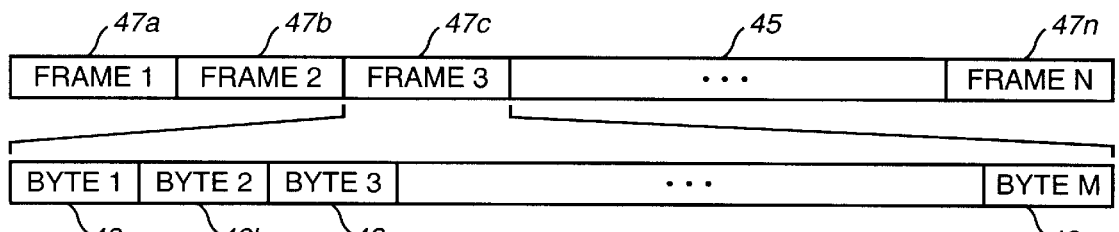
FIG. 3 is a pictorial representation of a frame and data buffer structure according to the present invention.

Referring now to FIG. 3, there is shown details of a data buffer 45 according to the present invention. Data buffer 45 is a sufficiently large FIFO buffer that receives a serial bit stream from shift register 27 of FIG. 2 and outputs a serial bit stream to shift register 35 of FIG. 2. According to the present invention, a frame and byte structure is superimposed upon data buffer 45. At any instance of time, data buffer 45 contains a plurality of frames 47. Each frame 47 comprises a plurality of multibit bytes 49.

Figure 4:
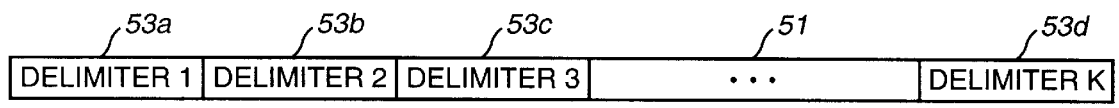
FIG. 4 is a pictorial representation of a delimiter queue according to the present invention.

The location of frames 47 within data buffer 45 is maintained with reference to a delimiter queue 51, as illustrated in FIG. 4. Delimiter queue 51 contains a plurality of delimiters 53. Delimiters 53 are either beginning delimiters or end delimiters and each delimiter 53 includes an indication of its type (i.e., beginning or end) and an offset into data buffer 45 to identify the beginning and end of each frame 47. The offset depends on the number of optical wavelengths that form a pulse of data, which corresponds to the size of the multibit data unit. For example, eight wavelengths for optical data transmission with an additional wavelength for framing implies an eight-bit data unit. Therefore, an offset into data buffer 45 would be in terms of eight-bit bytes. An offset of 0 points to the first byte, 1 points to the second byte, and N points to the (N+1)th byte.

Figure 5:
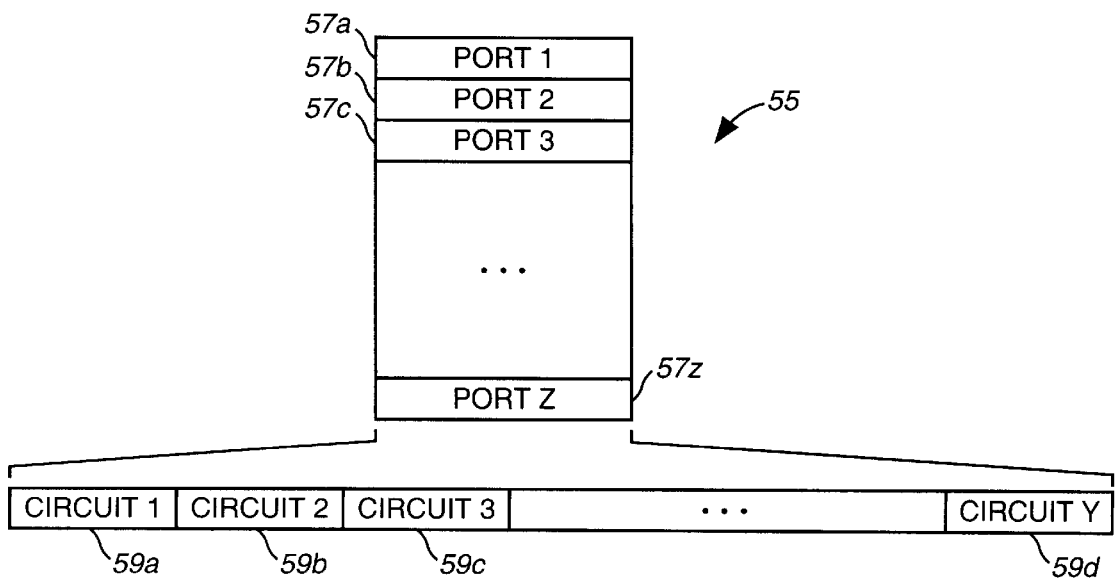
FIG. 5 is a pictorial representation of an add map or drop map according to the present invention.

Referring now to FIG. 5, a map is designated generally by the numeral 55. In the preferred embodiment, add/drop multiplexer 29 of FIG. 2 includes an add map and a drop map. Add maps and drop maps are structurally the same, and each is of the structure shown in FIG. 5. Add/drop multiplexer 29 of the present invention uses add and drop maps, of the type of map 55, in order to add data to and drop data from data buffer 45. The add and drop maps are maintained by a network control system (not shown). The network control system dynamically updates the maps through an appropriate interface as is data units in the network are added and dropped. The network control system provides the intelligence for maintaining maps correctly at all nodes 13. Maps are dynamically altered at significantly small windows of time to maintain circuits through the network.

Each map 55 includes a set of port descriptors 57. Each port descriptor 57 corresponds to a trunk port of a node 13 of FIG. 1. Each port descriptor 57 includes a set of circuit descriptors 59. Circuit descriptors 59 identify the circuits associated with each port 57. Each circuit descriptor 59 contains an indicator whether data is to be added, in the case of an add map, or dropped, in the case of a drop map. An indicator of −1 indicates that no action is to be performed for that particular port circuit. A positive number indicator is an offset into a frame where data is to be added or dropped.

Figure 6:
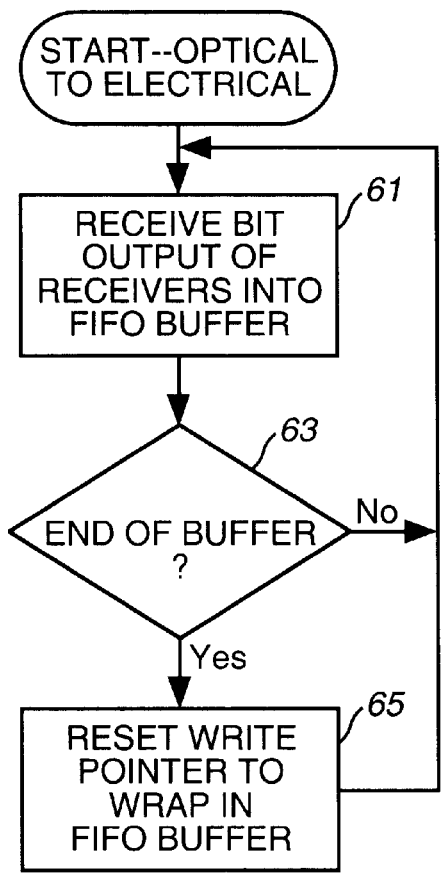
FIG. 6 is a flowchart of data buffer processing according to the present invention.
Figure 7:
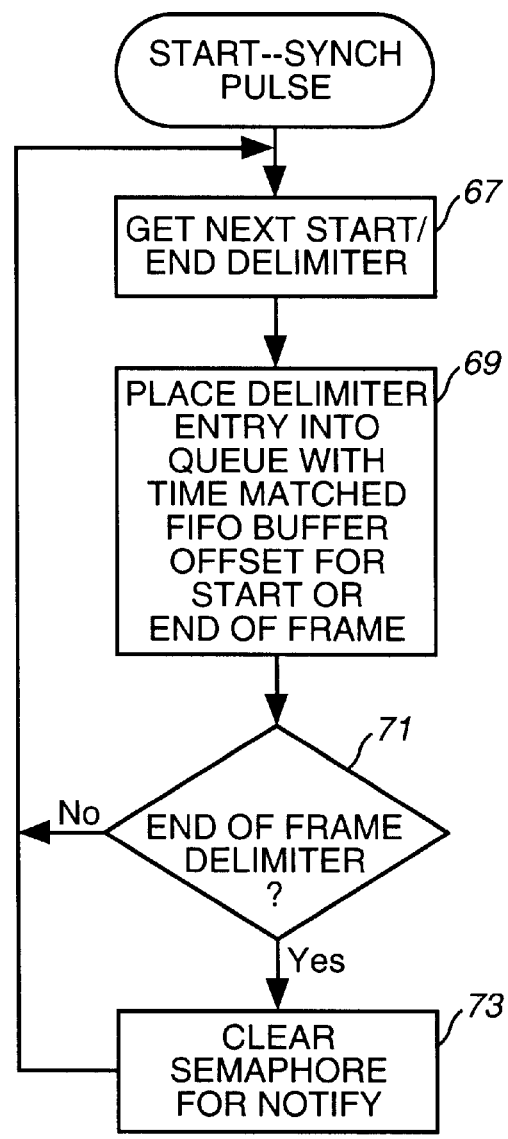
FIG. 7 is a flowchart of delimiter queue processing according to the present invention.
Figure 8:
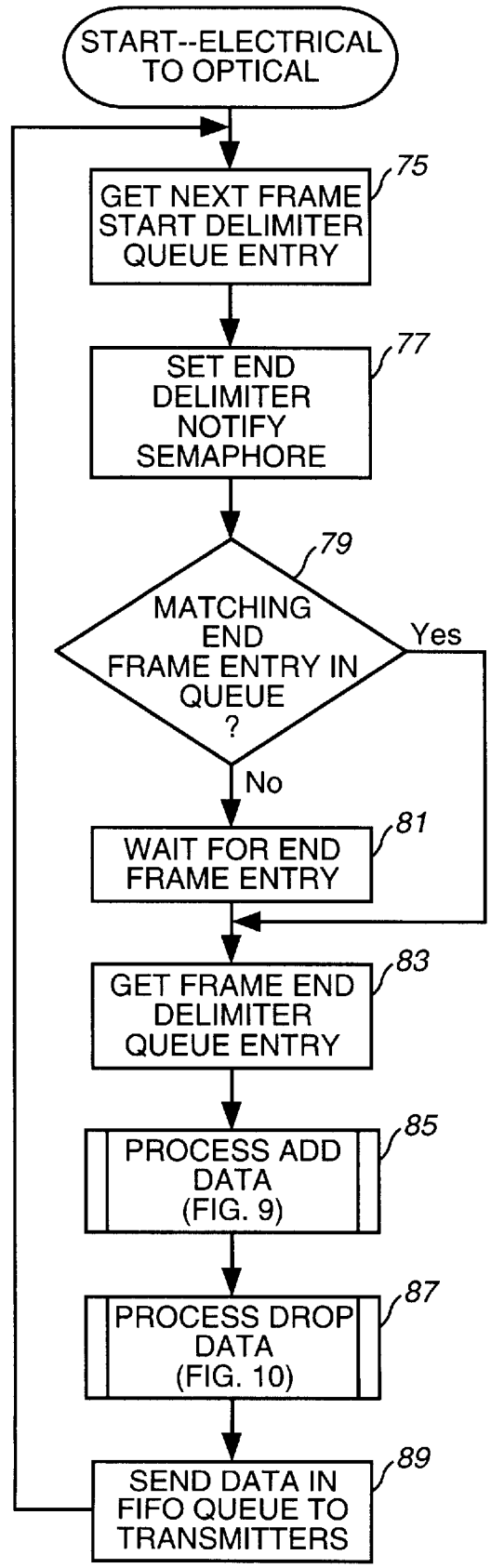
FIG. 8 is a flowchart of add and drop processing in the data buffer according to the present invention.

Referring now to FIGS. 6–10, there is shown processing performed in the preferred embodiment of the add/drop multiplexer according to the present invention. FIGS. 6, 7, and 8 are independent threads of execution, preferably on separate hardware processors. Referring first to FIG. 6, which illustrates data buffer processing according to the present invention. The bit output of the optical receivers is received into the data buffer 45 at block 61. The data buffer is large enough to hold enough frames so that wrapping in the buffer is performed without loss of information. The add/drop multiplexer tests, at decision block 63 whether or not the end of the data buffer 45 is reached. If not, processing continues at block 61. If the end of the buffer is reached, then the write pointer is reset to wrap (i.e., start at the beginning again) in the data buffer, at block 65, and processing continues at block 61.

Referring now to FIG. 7, there is shown delimiter queue processing according to the present invention. In the preferred embodiment, the framing bits are transmitted in synchronization with the data pulses. The beginning or ending of a frame is indicated by a particular sequence of framing bits. When the add/drop multiplexer of the present invention receives and detects a bit sequence that indicates the beginning or end of a frame, the add/drop multiplexer identifies and gets the next start or end delimiter, at block 67, and places the appropriate delimiter entry into the queue with a time matched data buffer offset for the start or end of the frame, at block 69.

The instant in time when the frame delimiter is recognized, the value of the current offset for writing the next multibit data unit into the data buffer is used in creating the delimiter placed in the delimiter queue. A delimiter contains a field that identifies whether it is a start or stop delimiter and a field that contains the offset into the data buffer where the frame begins or ends. Depending on the number of bytes that make up a frame, the offset value of the delimiter will be a function of the timing between placing data in the data buffer and processing a frame delimiter at block 69. This function is fixed for all delimiters.

The add/drop multiplexer tests, at decision block 71, whether or not the delimiter is an end of frame delimiter. If not, processing continues at block 67. If, at decision block 71, the delimiter is an end of frame delimiter, then the add/drop multiplexer clears an end semaphore for notifying FIG. 8 processing that an end frame delimiter has been processed, at block 73, and processing continues at block 67.

Figure 9:
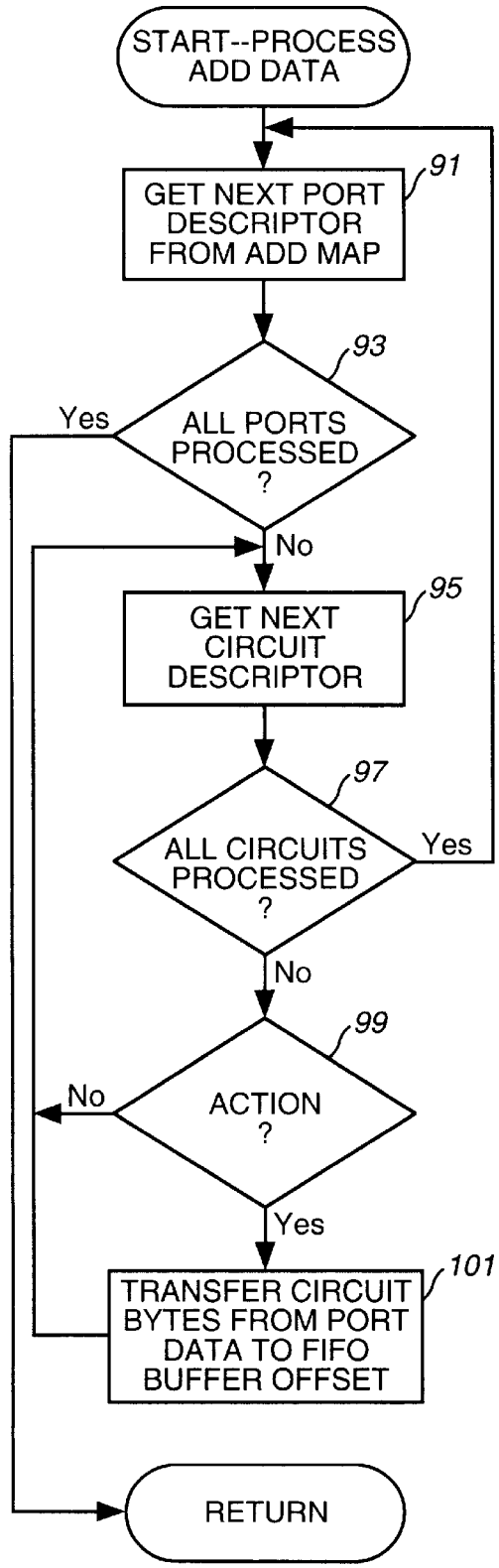
FIG. 9 is a flowchart of add data processing of FIG. 8 according to the present invention.
Figure 10:
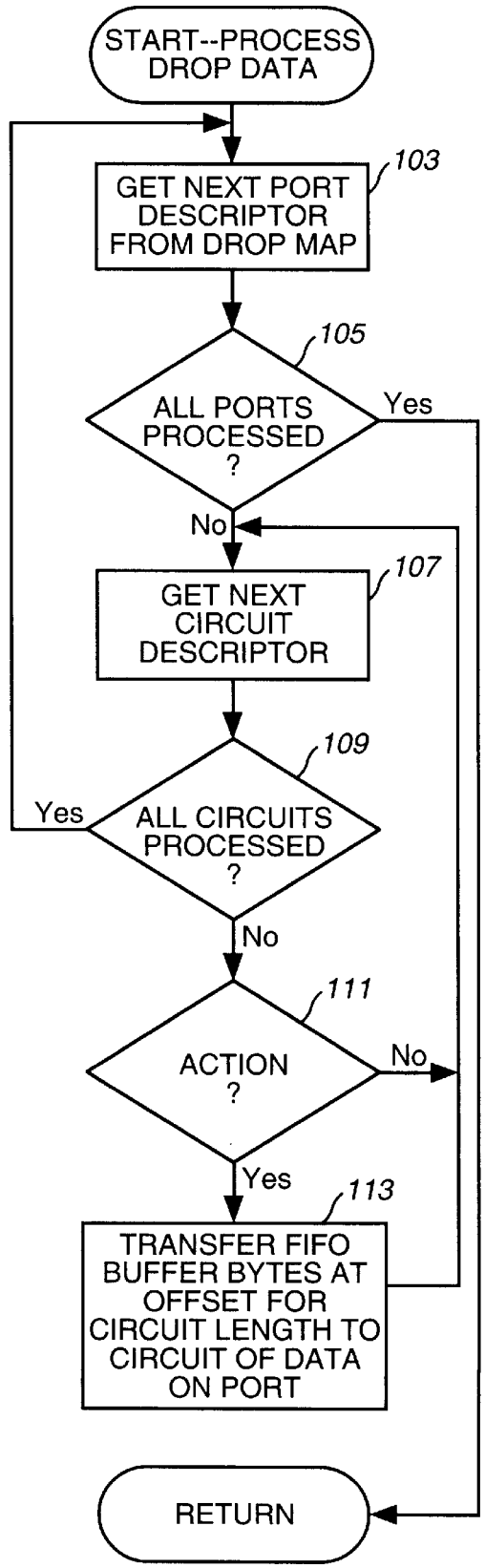
FIG. 10 is a flowchart of drop data processing of FIG. 8 according to the present invention.

The adding and dropping of data to the frames is illustrated with respect to FIGS. 8–10. Referring first to FIG. 8, the add/drop multiplexer waits to get the next start frame delimiter queue entry, at block 75. Block 75 is an implicit wait until a start delimiter queue entry is available. Appropriate system queue management provides this function, in the manner known to those skilled in the art. When the add/drop multiplexer gets the next start frame delimiter queue entry, at block 75, the add/drop multiplexer sets the end delimiter notify semaphore, at block 77. Then, the add/drop multiplexer tests by performing a queue peek, at decision block 79, whether or not a matching end frame entry is in the delimiter queue. If not, the system waits for the end frame entry, at block 81. The clearing of the end delimiter semaphore at block 73 causes block 81 to flow to block 83. When, at block 83, the add/drop multiplexer has received both a frame start delimiter and a matching frame end delimiter, it is then appropriate to add data to and drop data from the complete frame of data in the data buffer. Delimiters are removed from the delimiter queue by blocks 75 and 83. Thereafter, the add/drop multiplexer processes add data, as indicated generally at block 85 and shown in detail with respect to FIG. 9, and processes drop data, as indicated generally at block 87 and shown in detail with respect to FIG. 10. Processing according to blocks 85 and 87 may be performed serially for bidirectional transmission, as shown in FIG. 8, or alternatively they may be performed as parallel threads on separate central processing units for unidirectional data transmission. After processing the add data at block 85 and the drop data at block 87, the add/drop multiplexer sends the data of a processed frame in the data buffer, along with an associated framing signal, to the transmitters, as described with respect to FIG. 2, at block 89, and processing continues at block 75.

Referring now to FIG. 9, there is shown add data processing. The add/drop multiplexer gets the first (or next) port descriptor from the add map, at block 91. Then, the add/drop multiplexer tests, at decision block 93, whether or not all ports have been processed (i.e., end of data at block 91). If so, the system returns to FIG. 8 processing. If all the ports of the add map have not been processed, then the system gets the first (or next) circuit descriptor from the add map, at block 95, and tests, at decision block 97 whether or not all circuits have been processed (i.e., end of data at block 95). If so, processing continues at block 91 for the next port descriptor. If all circuits have not been processed, then the add/drop multiplexer tests, at decision block 99, whether or not an action is to be performed with respect to the currently processed circuit according to block 95. It will be recalled that a −1 circuit descriptor indicates no action is to be taken. If, at decision block 99, the circuit descriptor is −1, then processing continues at block 95. If the circuit descriptor is not −1, then the multiplexer transfers circuit bytes received from the port data API into the data buffer at the offset indicated by the circuit descriptor, at block 101, and processing continues at block 95.

Referring now to FIG. 10, there is shown a flow chart of drop data processing according to the present invention. First, the add/drop multiplexer gets the first (or next) port descriptor from the drop map, at block 103. Then, the add/drop multiplexer tests whether or not all ports have been processed, at block 105. If so, the add/drop multiplexer returns to FIG. 8 processing. If all ports have not been processed, then the add/drop multiplexer gets the first (or next) circuit descriptor from the drop map, at block 107 and tests, at decision block 109, whether or not all circuits have been processed. If so, processing continues at block 103. If all circuits have not been processed, then the add/drop multiplexer determines whether or not an action is required for the particular circuit, at decision block 111. If not, processing continues at block 107. If the circuit descriptor is not −1, then the add/drop multiplexer transfers bytes from the data buffer at the offset indicated by the circuit descriptor to the applicable port through the data API, at block 113 and processing continues at block 107.

From the foregoing, it may be seen that the present invention provides an add/drop multiplexer for systems that transmit data in streams of multiwavelength optical pulse multibit data units. Those skilled in the art will recognize that the present invention has been illustrated and described with respect to a presently preferred embodiment. The spirit and scope of the invention is set forth in the following claims.

What is claimed is:

1. A method of adding multibit data units to and dropping multibit data units from a stream of multiwavelength optical pulse multibit data units, which comprises the steps of:

converting said stream of multiwavelength optical pulse multibit data units into a stream electrical bits;

identifying an add location in said stream of electrical bits to add a multibit data unit to said stream of electrical bits;

adding a multibit data unit to said stream of electrical bits at said add location;

identifying a drop location in said stream of electrical bits to drop a multibit data unit from said stream of electrical bits;

dropping a multibit data unit from said stream of electrical bits at said drop location; and, converting said stream of electrical data bits into a stream of multiwavelength optical pulse data multibit data units.

2. The method as claimed in claim 1, wherein said step of converting said stream of multiwavelength optical pulse multibit data units into a stream of electrical bits comprises the steps of:

demultiplexing a multiwavelength optical pulse multibit data unit into a plurality of single wavelength optical bits; and, converting each of said single wavelength optical bits into an electrical bit.

3. The method as claimed in claim 1, wherein said step of converting said stream of electrical bits into a stream of multiwavelength optical pulse multibit data units comprises the steps of:

substantially simultaneously converting each bit of a multibit data unit of said stream of electrical bits into a single wavelength optical bit; and, multiplexing said optical bits into a single multiwavelength optical pulse multibit data unit.

4. The method as claimed in claim 1, including the step of: placing said stream of electrical bits into a data buffer.

5. The method as claimed in claim 4, wherein said step of identifying an add location in said stream of electrical bits comprises the step of:

identifying an offset into said data buffer.

6. The method as claimed in claim 5, wherein said step of identifying an offset into said data buffer comprises the steps of:

receiving an optical framing signal on a separate wavelength from the wavelengths of said stream of multiwavelength optical pulse multibit data units, said framing signal identifying a start of frame offset into said data buffer; and, locating an offset from said start of frame offset in an add map.

7. The method as claimed in claim 6, wherein said step of receiving an optical framing signal comprises the steps of:

demultiplexing said optical framing signal from said stream of multiwavelength optical pulse multibit data units to form a stream of optical framing bits on said separate wavelength;

converting said stream of optical framing bits to a stream of electrical framing bits; and, detecting a start frame delimiter in said stream of electrical framing bits.

8. The method as claimed in claim 7, including the step of placing a start frame delimiter containing an offset to an associated frame in said data buffer into a delimiter queue.

9. The method as claimed in claim 4, wherein said step of identifying a drop location in said stream of electrical bits comprises the step of:

identifying an offset into said data buffer.

10. The method as claimed in claim 9, wherein said step of identifying an offset into said data buffer comprises the steps of:

receiving an optical framing signal on a separate wavelength from the wavelengths of said stream of multiwavelength optical pulse multibit data units, said framing signal identifying a start of frame offset into said data buffer; and, locating an offset from said start of frame offset in a drop map.

11. The method as claimed in claim 10, wherein said step of receiving an optical framing signal comprises the steps of:

demultiplexing said optical framing signal from said stream of multiwavelength optical pulse multibit data units to form a stream of optical framing bits on said separate wavelength;

converting said stream of optical framing bits to a stream of electrical framing bits; and, detecting a start frame delimiter in said stream of electrical framing bits.

12. The method as claimed in claim 11, including the step of placing a start frame delimiter containing an offset into an associated frame into a delimiter queue.

13. A system for adding multibit data units to and dropping multibit data units from a stream of multiwavelength optical pulse multibit data units, which comprises:

a wavelength division demultiplexer configured to receive said stream of multiwavelength optical pulse multibit data units and a stream of optical framing bits transmitted on a different wavelength from said stream of multiwavelength optical pulse multibit data units, and converting each optical pulse and each bit of said stream of framing bits into a separate optical bit;

a plurality of first optical receivers configured to convert each optical bit of a multiwavelength optical pulse multibit data unit into an electrical data bit;

a second optical receiver configured to convert each optical bit of said stream of framing bits into an electrical framing bit;

a data buffer configured to receive a serial stream of electrical data bits from said first optical receivers;

means for detecting frame beginning delimiters and frame end delimiters in a stream of electrical framing bits, and for associating said frame beginning delimiters and said frame end delimiters with offsets into said data buffer;

a frame delimiter queue, said frame delimiter queue containing frame beginning delimiters and frame ending delimiters and associated offsets into said data buffer;

an add map, said add map containing offsets into frames for the insertion data into said data buffer; and, a drop map, said drop map containing offsets into frames for removing data from said data buffer.

14. The system as claimed in claim 13, including means for adding multibit data units to said data buffer according to said add map.

15. The system as claimed in claim 13, including means for dropping multibit data units from said data buffer according to said drop map.

16. The system as claimed in claim 13, further comprising:

a plurality of first optical transmitters, each transmitting on a different wavelength and configured to receive a serial stream of electrical data bits from said data buffer and convert multibit data units of said serial stream substantially simultaneously into optical data bits;

a second optical transmitter transmitting a wavelength different from the wavelengths of said first optical transmitters and configured to convert a stream of electrical framing bits into a stream of optical framing bits;

a wavelength division multiplexer configured to multiplex said optical data bits and said framing bits into a stream multiwavelength optical pulse multibit data units.

* * * * *